United States Patent [19]
Nishishita et al.

[11] Patent Number: 5,446,202
[45] Date of Patent: Aug. 29, 1995

[54] OVER-BASED SULFURIZED ALKALINE EARTH METAL PHENATE AND PROCESS FOR PRODUCING THE SAME

[75] Inventors: Makoto Nishishita; Masato Goto; Sanae Ueda, all of Saitama, Japan

[73] Assignees: Cosmo Research Institute; Cosmo Oil Co., Ltd., Tokyo, Japan

[21] Appl. No.: 294,039

[22] Filed: Aug. 24, 1994

[30] Foreign Application Priority Data

Aug. 25, 1993 [JP] Japan .................. 5-234125
Feb. 25, 1994 [JP] Japan .................. 6-053230

[51] Int. Cl.$^6$ .................................... C07C 319/14
[52] U.S. Cl. ........................... 568/23; 252/33.3; 252/18; 252/25; 252/42.7; 252/48.6
[58] Field of Search ............... 568/23; 255/18, 25, 255/33.3, 427, 48.6

[56] References Cited

U.S. PATENT DOCUMENTS 5,223,163  6/1993  Coolbaugh ............... 252/33.3

FOREIGN PATENT DOCUMENTS 0094814  11/1983  European Pat. Off. .
0271262  6/1988   European Pat. Off. .
0354647  2/1990   European Pat. Off. .
0410648  1/1991   European Pat. Off. .
0486893  5/1992   European Pat. Off. .
2653717  6/1977   Germany .
2126602  3/1984   United Kingdom .

*Primary Examiner*—James H. Reamer
*Attorney, Agent, or Firm*—Sughrue, Mion, Zinn, Macpeak & Seas

[57] ABSTRACT

Disclosed are a process for producing an over-based sulfurized alkaline earth metal phenate which comprises reacting either a mixture of reaction materials comprising a phenol, a dihydric alcohol, an alkaline earth metal reagent which is an alkaline earth metal oxide or hydroxide or a mixture of both, and sulfur or a mixture of these reaction materials with water, distilling off an excess amount of the dihydric alcohol and at least excess amount of water, and subsequently treating the resulting distillation residue with carbon dioxide, wherein the carbon dioxide treatment is carried out (A) in the presence of 0.001 to 0.7 mol of a fatty acid or a fatty amine per 1 mol of the alkaline earth metal reagent and (B) in the presence of either (i) 0.01 to 0.9 mol of water per 1 mol of the alkaline earth metal reagent or (ii) 0.05 to 5.0 mol of a lower alcohol containing 1 to 4 carbon atoms per 1 mol of the alkaline earth metal reagent or (iii) both of (i) and (ii); and an over-based sulfurized alkaline earth metal phenate having a base number of 250 to 400 mgKOH/g, a viscosity of 40 to 1,000 cSt at 100° C. and a color of L3.0 to 8.0Dil (by ASTM), and contains 0.1 to 50 wt % of the fatty acid or the fatty amine based on the total amount thereof, which is produced by the above-mentioned process.

15 Claims, No Drawings

OVER-BASED SULFURIZED ALKALINE EARTH METAL PHENATE AND PROCESS FOR PRODUCING THE SAME

FIELD OF THE INVENTION

The present invention relates to an over-based sulfurized alkaline earth metal phenate and a process for producing the same, useful as a detergent for lubricating oil or fuel oil or an alkaline detergent, which has a high base number, is excellent in oil solubility and heat resistance, and has a bright color, in which a specific amount of fatty acids or fatty amines is added and a carbon dioxide treatment is conducted in the presence of a specific amount of water or lower alcohols.

BACKGROUND OF THE INVENTION

An alkaline earth metal phenate is one of the alkaline detergents for use in lubricating oils for mainly internal combustion engines, which functions to neutralize and disperse acid substances, sludge, etc. generated in engines. The existence of an alkaline earth metal phenate makes it possible to prevent engines parts from excessive corroding caused by acid substances generated in engines and prevent engine parts from excessive wearing caused by sludge or lacquer generated engines. Recently, in order to have high acid-neutralizing ability, over-based alkaline earth metal phenates have been developed (a phenate which contains an alkaline earth metal in an amount of more than the theoretical amount per an alkylphenol). At present, sulfurized types have been mainly used to improve heat resistance and oil solubility. Furthermore, in order to obtain an alkaline earth metal phenate having higher over-basicity, in some cases carboxylic acids or alcohols are added to alkaline earth metal phenates.

Insofar as typical conventional methods for introducing sulfur into phenates are concerned, two methods are generally known. One of them is a method wherein an alkylphenol is treated with sulfur chloride to form a sulfide which is then converted into a metal salt. The other is a method wherein sulfurization is carried out by using elemental sulfur during metal addition or after previously forming a metal salt. The present invention belongs to the latter sulfurization method. Many past attempts have been made to produce over-based phenates by using the latter sulfurization method, for instance, it is reported that over-based phenates containing alkaline earth metals in an amount of at least twice the theoretical amount are obtained by one metal addition reaction.

For example, JP-B-60-28878 discloses that highly basic alkaline earth metal phenates can be unexpectedly produced by carrying out the above-mentioned reaction in the presence of an excess of phenols. (The term "JP-B" as used herein means an "examined Japanese patent publication".)

Further, JP-B-3-10611 discloses reacting a phenol, a dihydric alcohol, an alkaline earth metal reagent and optionally sulfur to conduct a metal addition of phenols which may be conducted with sulfurization, whereby the conversion per one reaction of alkaline earth metal reagents into products can be remarkably improved by the addition of a suitable amount of water without the necessity of an excess amount of dihydric alcohols.

In contrast to a conventional method in which a large excess amount of alkaline earth metal reagents is used per an alkylphenol to provide an over-based product, these two methods succeed in providing an over-based phenate by using a large excess amount of alkylphenols per an alkaline earth metal reagent, which makes it possible to use all materials, except for mineral oil as a diluent oil, which are directly concerned with the reaction system as reaction materials without the necessity of special solvents or additives. Accordingly, these two methods are advantageous in minimizing the kind of reaction materials to be used.

Moreover, it has been found that when an intermediate product of the metal addition/sulfurization reaction is reacted with carbon dioxide, the presence of water provides undesirable situations such as deterioration of the stability of a final product and prevention of smooth progress of the carbonation reaction (as disclosed in JP-B-3-10611). Contrary to these conventional findings, the present inventors have found that when excess dihydric alcohol is removed from the intermediate product and then the resulting intermediate product is reacted with carbon dioxide in the presence of an appropriate amount of water, the gram equivalent ratio of an alkaline earth metal per phenol component of an over-based phenate product (hereinafter referred to as "PEQ (product equivalent) value") is significantly improved (as disclosed in JP-A-5-238976 and JP-A-6-65192). (The term "JP-A" as used herein means an "unexamined Japanese patent application".) The improvement of PEQ value results in a reduction of the amount of expensive alkylphenols with a great deal of economical effect, since, in general, when additives such as a phenate are added to lubricating oil, the addition amount thereof is calculated based on the base number.

Furthermore, JP-A-6-184581 proposes decreasing the viscosity of over-based sulfurized alkaline earth metal phenates by lowering a sulfur content to be used.

However, in the methods of JP-B-60-28878 and JP-B-3-10611, it is extremely difficult to produce over-based sulfurized alkaline earth metal phenates having higher base numbers than conventional ones, and even though a product having a high base number is produced, the product has an extremely high viscosity, whereby it is disadvantageous in handleability. Moreover, JP-A-5-238976, JP-A-6-65192 and JP-A-6-184581 make it possible to improve the base number of over-based sulfurized alkaline earth metal phenates, but they are disadvantageous in that the color is dark and the oil solubility is poor.

Also, there is an example in which over-based sulfurized alkaline earth metal phenates are produced by adding fatty acids. For example, JP-A-58-225197 discloses that an alkylphenol, sulfur, a dihydric alcohol and an alkaline earth metal acid compound are reacted in an alcohol solvent and then in the subsequent carbon dioxide treatment, an organic carboxylic acid is added thereto in an amount of 0.1 to 10% based on the total amount thereof during or after the reaction to produce lubricating oil additives (over-based sulfurized alkaline earth metal phenates). The lubricating oil additives obtained by this method are improved in the viscosity, are prevented from foaming, and are improved in anti-sedimentation. In this method, however, the base number of the final product has as large as 250 mgKOH/g and it is impossible to further improve the base number, thus this is merely an example for lowering the viscosity of saturated fatty acids and for preventing the foaming.

Furthermore, JP-W-1-501399 and JP-W-1-501400 discloses producing a product having a base number of more than 300 mgKOH/g and a viscosity of 1,000 cSt or lower at 100° C. by incorporating 2 to 40 wt % of carboxylic acids based on the total amount of phenates to conduct a metal addition reaction once or plural times. (The term "JP-W" as used herein means an "unexamined published International Japanese patent application"). In this method, however, the metal addition reaction must be repeated twice or more to produce a product which satisfies desired two performances at the same time; that is, the high base number and the low viscosity. JP-W-1-501399 and JP-W-1-501400 make it possible to improve the base number by the addition of fatty acids, but since they require plural metal addition reactions, which is disadvantageous in that the number of steps and the production costs are increased. In addition, JP-A-58-225197 improves the viscosity and the foaming resistance, but a product having a higher base number than those conventional ones cannot be obtained.

SUMMARY OF THE INVENTION

With the aim of attaining these objects, the present inventors have made intensive studies and found that an over-based sulfurized alkaline earth metal phenate having a high base number which shows a relatively low viscosity and a bright color and is excellent in the storage stability can be obtained by conducting a carbon dioxide treatment in the presence of a specific amount of fatty acids or fatty amines (which is added before the carbon dioxide treatment) and a specific amount of water or lower alcohols (which has been removed out from the reaction system before the carbon dioxide treatment, since it has been conventionally considered to lower the stability of the phenate) after removal of excess dihydric alcohols and at least excess water from the intermediate product on which has been conducted the sulfurized metal addition reaction, thus completing the present invention.

An object of the present invention is to provide an over-based sulfurized alkaline earth metal phenate having a high base number and which shows a bright color which is excellent in the oil solubility and the heat resistance by one metal addition reaction, and to provide a process for producing the same economically.

The present invention is accomplished with a process for producing an over-based sulfurized alkaline earth metal phenate which comprises reacting either a mixture of reaction materials comprising a phenol, a dihydric alcohol, an alkaline earth metal oxide or hydroxide or a mixture of both (hereinafter referred to as "alkaline earth metal reagent"), and sulfur or a mixture of these reaction materials with water, distilling off an excess amount of the dihydric alcohol and at least an excess amount of water, and subsequently treating the resulting distillation residue with carbon dioxide, wherein the carbon dioxide treatment is carried out (A) in the presence of 0.001 to 0.7 mol of a fatty acid or a fatty amine per 1 mol of the alkaline earth metal reagent and (B) in the presence of either (i) 0.01 to 0.9 mol of water per 1 mol of the alkaline earth metal reagent or (ii) 0.05 to 5.0 mol of a lower alcohol containing 1 to 4 carbon atoms per 1 mol of the alkaline earth metal reagent or (iii) both of (i) and (ii).

Also, the present invention provides an over-based sulfurized alkaline earth metal phenate produced by the above-mentioned process, which has a base number of 250 to 400 mgKOH/g, a viscosity of 40 to 1,000 cSt at 100° C. and a color of L3.0 to 8.0Dil (by ASTM), and contains 0.1 to 50 wt % of the fatty acid or the fatty amine based on the total amount thereof.

DETAILED DESCRIPTION OF THE INVENTION

Phenols which can be used in the present invention include those having a hydrocarbon side chain of 4 to 36 carbon atoms, preferably 8 to 32 carbon atoms, such as an alkyl group, an alkenyl group, an aralkyl group or the like group. More specifically, examples of such phenols include those having a hydrocarbon group such as butyl, amyl, octyl, nonyl, dodecyl, cetyl, ethylhexyl, triacontyl, and the like or a group derived from a petroleum hydrocarbon such as liquid paraffin, wax, or an olefinic polymer (e.g., polyethylene, polypropylene, polybutene). These phenols may be used either alone or as a mixture of two or more. It is desirable to use phenols which are in a liquid state at about 130° C., preferably at about 120° C. or lower.

Alkaline earth metal reagents which can be used in the present invention include an oxide or hydroxide or a mixture of both of an oxide and hydroxide of alkaline earth metal. Examples thereof include, for example, oxides or hydroxides of calcium, barium, strontium and magnesium. The amount of the alkaline earth metal reagent to be used is 0.01 to 0.99 equivalent, preferably 0.01 to 0.98 equivalent, more preferably 0.1 to 0.9 equivalent, per one equivalent of the phenol. If the amount of the alkaline earth metal reagent relative to the phenol amount is too large, a product of interest having desired properties cannot be obtained, because the intermediate product gels and hence the reaction does not proceed any longer. If the amount thereof is too small, not only does the product yield from the reaction materials decrease, but also the recovery of the phenol is economically disadvantageous because of increased utility costs and much time required therefor.

Dihydric alcohols which can be used in the present invention have a relatively low boiling point and a low viscosity and are highly reactive. Preferred dihydric alcohols are those having 2 to 6 carbon atoms, with ethylene glycol, propylene glycol, and the like being especially preferred. The dihydric alcohol facilitates the reaction of the phenol with the alkaline earth metal reagent to thereby convert them into a stable oil-soluble material, and a part of the dihydric alcohol is incorporated into the final phenate product to form an overbased phenate. In the process according to the present invention, the metal addition reaction may be carried out either in the presence or absence of water which is effective in enhancing the reaction. When water is added in conducting the reaction, the dihydric alcohol is used in an amount of about 0.15 to 3.0 mol, preferably about 0.3 to 1.5 mol, per mol of the alkaline earth metal reagent. When water is not added in conducting the reaction, the dihydric alcohol is used in an amount of about 1.0 to 3.0 mol, preferably 1.2 to 2.0, per mol of the alkaline earth metal reagent. If the amount of the dihydric alcohol is too small, the conversion of reaction materials, especially the alkaline earth metal reagent, into a product, is lowered. If the amount thereof is too large, the removal by distillation of the excess dihydric alcohol from the reaction product necessitates much time and increased utility costs, although the metal addition reaction with the phenol proceeds smoothly.

Sulfur is used in an amount of 0.001 to 3.0 mol, preferably 0.01 to 1.5 mol, more preferably 0.1 to 0.5 mol, per mol of the alkaline earth metal reagent. The viscosity of the product becomes lower as the amount of the sulfur used decreases. If the amount thereof is too large, not only does the product have reduced over-basicity and hence a product having a high base number is difficult to obtain, but also the product disadvantageously has an extremely high viscosity.

When water is added to the reaction system for the purpose of enhancing a metal addition reaction of the alkaline earth metal reagent to phenols, any of various kinds of water can be used such as condensate water (discharged from a boiler), industrial water, and the water formed by the metal addition reaction, and the like, as well as distilled water. There is no particular limitation on water quality, and water in any state can be used such as cold water, warm water, steam, etc. The water for use in enhancing the metal addition reaction may be introduced alone to a reactor, or it may be introduced as a mixture of a part or all of the volume of the water with other reaction materials such as a phenol and a dihydric alcohol. The timing of the water addition to a reactor is not particularly limited, and it may be either before or after the mixing of all reaction materials except for the water. It is, however, preferred to add water within about one hour after completion of the mixing of all reaction materials. The water for use in enhancing the metal addition reaction is introduced into the reaction system in an amount of about 0.01 to 10 mol, preferably 0.1 to 2.0 mol, more preferably 0.1 to 1.0 mol, per mol of the alkaline earth metal reagent. When the metal addition reaction is carried out by adding water from outside into the reaction system, the reaction proceeds more smoothly and the product conversion ratio of reaction materials, especially the alkaline earth metal reagent, becomes higher, in comparison with the case of a reaction carried out under the same conditions except that water is not added. In consequence, the conversion ratio of the alkaline earth metal reagent to the product decreases if the amount of water to be added to the reaction system is too small. On the contrary, if the amount of water is too large, the advantage of simplifying the distillation step after the reaction is lost.

In general, the addition of water to be present at the time of the carbon dioxide treatment is conducted after the completion of reacting reaction materials including a phenol, a dihydric alcohol and an alkaline earth metal reagent, and sulfur or a water-added mixture thereof, completing a sulfurized metal addition reaction and distilling off water and excess dihydric alcohol. The water to be present at the time of the carbon dioxide treatment has no particular limitation in its quality and condition, similar to the case of the water to be added for the enhancement of the metal addition reaction. The amount of water in the reaction system is controlled within the range of 0.01 to 0.9 mol, preferably 0.05 to 0.6 mol, more preferably 0.1 to 0.5 mol, per mol of the alkaline earth metal reagent.

When an excess amount of the dihydric alcohol is present in the reaction system, water in the system including added water and formed water by the reaction is entirely removed during removal of the excess dihydric alcohol by distillation. In such a case, therefore, it is necessary to add a predetermined amount of water after the removal of excess dihydric alcohol. On the other hand, when the dihydric alcohol is not present in an excess amount in the reaction system, an excess portion of water remaining in the reaction system after completion of the reaction, which has been added as a reaction enhancer before the sulfurized metal addition reaction or formed during the reaction, may be removed by distillation, leaving only a predetermined amount of water. When the amount of remaining water cannot be determined, it is desirable to add a predetermined amount of water after removing the entire amount of the remaining water by distillation.

As the amount of water to be present at the time of the carbon dioxide treatment increases, the base number of the product is improved. However, if the amount thereof is too large, the product is excessively hydrolyzed, which causes a decrease in the base number and a deterioration of the oil solubility. If the amount thereof is too small, it is not sufficient to improve the base number.

In the process of the present invention, a carbon dioxide treatment can be effected in the presence of a lower alcohol containing 1 to 4 carbon atoms.

Examples of the alcohol include, for example, methyl alcohol, ethyl alcohol, n-propyl alcohol, i-propyl alcohol and n-butyl alcohol. The amount of the alcohol to be used is 0.05 to 5.0 mol, preferably 0.1 to 2.0 mol, more preferably 0.1 to 1.5 mol, per mol of the alkaline earth metal reagent. The alcohol to be used may partly contain water and may be used with water.

Fatty acids to be present before the carbon dioxide treatment include those containing 10 to 30 carbon atoms, preferably 16 to 24 carbon atoms or salts thereof with alkaline earth metal salts being preferred. Preferred fatty acids are those in which its alkyl chain is straight. More specifically, examples of the fatty acid include, for example, capric acid, lauric acid, palmitic acid, stearic acid, behenic acid, lignoceric acid, cerotic acid, montanic acid and melissic acid. Among these, the use of stearic acid is preferred. The amount of the fatty acid to be used is 0.001 to 0.7 mol, preferably 0.01 to 0.7 mol, more preferably 0.05 to 0.7 mol, most preferably 0.05 to 0.6 mol, per mol of the alkaline earth metal reagent.

If the amount of the fatty acid is too small, the base number of the phenate cannot be further improved, and the color and the oil solubility are decreased. If the amount thereof is too large, the base number is decreased.

Fatty amines to be present before the carbon dioxide treatment include those containing 10 to 30 carbon atoms, preferably 12 to 18 carbon atoms, more preferably 16 to 24 carbon atoms. Preferred fatty amines are those in which its alkyl chain is straight. More specifically, examples of the fatty amine include, for example, decylamine, undecylamine, dodecylamine, tridecylamine, tetradecylamine, pentadecylamine, hexadecylamine, heptadecylamine and stearylamine. Among these, the use of stearylamine is preferred. The amount of the fatty amine to be used is 0.001 to 0.7 mol, preferably 0.01 to 0.6 mol, more preferably 0.05 to 0.4 mol, per mol of the alkaline earth metal reagent.

If the amount of the fatty amine is too small, the color and the oil solubility are decreased. If the amount thereof is too large, the base number is decreased.

The fatty acid and the fatty amine may be used in combination.

In the present invention, a diluent or solvent (hereinafter referred to as "diluent") having an appropriate viscosity may be added to the reaction system to facilitate the handling of the reaction materials, the intermediate products, the final products, etc. For example, when the excess unreacted phenol is to be recovered by distillation from the reaction product after completion of the sulfurization reaction stage or the carbon dioxide treatment, a bottom in a preferred liquid state can be obtained by conducting the distillation in the presence of a diluent having a high boiling point and an appropriate viscosity. Usually, a portion of the diluent is distilled off together with the unreacted phenol. Accordingly, it is preferred to use a diluent having no direct adverse effect on the reaction when the recovered phenol is repeatedly used for the reaction. If desired, the reaction may be conducted in the presence of a diluent. Thus, the metal addition reaction or the carbon dioxide treatment can be carried out in the presence of a diluent. Preferred examples of the diluent include petroleum fractions having an appropriate viscosity such as paraffinic, naphthenic and aromatic base oils and mixtures thereof. Specific examples thereof include lubricating oil fractions having boiling points of about 200° to 550° C. and viscosities of about 2 to 40 cSt at 100° C. In addition thereto, organic solvents which are hydrophobic and lipophilic can be used, so long as they do not have an adverse effect on the reaction or on the use of the final product.

The principal manufacturing processes and operating conditions for producing an over-based sulfurized alkaline earth metal phenate of the present invention are as follows:

The sulfurized metal addition reaction is carried out using a phenol, a dihydric alcohol, an alkaline earth metal reagent and sulfur. In addition thereto, a fatty acid or a fatty amine or water may be added. The reaction is carried out at a temperature in the range of 60° to 200° C., preferably about 90° to 190° C. There is no particular limitation on the reaction pressure, but it is selected in the range of 0.01 to 21 atm.A, preferably 0.1 to 11 atm.A. Usually, this reaction almost terminates within a time period of from about 1 to 9 hours.

The carbon dioxide treatment is carried out after distilling off excess dihydric alcohol and at least excess water in the reaction system. In cases where a fatty acid or a fatty amine is not previously added or the previously added fatty acid or fatty amine is small, they are added to make a predetermined amount, and a predetermined amount of water or a lower alcohol is added to the reaction system. The reaction is carried out with carbon dioxide at a temperature of from about 50° to 230° C., preferably 80° to 200° C. The reaction may be carried out under any of reduced pressures, normal pressures or elevated pressures, usually, in the range of 0.01 to 51 atm.A, preferably 0.1 to 31 atm.A, more preferably 0.2 to 11 atm.A. Usually, the reaction is carried out until the absorption of carbon dioxide is substantially terminated, and it is generally 20 minutes to 10 hours, usually 20 minutes to 3 hours. If necessary, the resulting product is maintained in a carbon dioxide atmosphere under 0 to 21 atm.A, preferably 0 to 11 atm.A at about 100° to 230° C. for several minutes to ten-and-several hours. The carbon dioxide treatment improves the performance of the final product as lubricating oil additives and fuel oil additives, especially oil solubility and stability when added to engine oils. The addition of a fatty acid or a fatty amine can be conducted at any time between at the addition of reaction materials to a reactor and before the carbon dioxide treatment; preferably it is before the addition of water at the carbon dioxide treatment.

It is possible to repeat the above-described metal addition reaction, with an alkaline earth metal reagent, a dihydric alcohol and, if necessary, a fatty acid or a fatty amine being added to the product of the carbon dioxide treatment and then repeat the carbon dioxide treatment once or more to further effect the metal addition. In this case, plural metal addition reactions further improve the base number of the final product.

It is preferred from an economical standpoint and others that a portion or most of the unreacted phenol present in the reaction product after the carbon dioxide treatment is recovered. The recovered phenol can be reused as a reaction material. When the distillation of the unreacted phenol is carried out in the presence of an ordinary diluent such as a mineral oil having a high boiling point, the distillation residue can be obtained in a preferred liquid state. Any insoluble matter remaining in the distillation residue can be removed by filtration, centrifugal separation, etc., before or after the phenol recovery.

The phenates according to the present invention obtained by the above-described process have a base number of 250 to 400 mgKOH/g, a viscosity of 40 to 1,000 cSt at 100° C. and a color of L3.0 to 8.0Dil (by ASTM).

Furthermore, in the over-based sulfurized alkaline earth metal phenate thus obtained, a phenate and a fatty acid or a fatty amine are present. When it is used as an additive for lubricating oils, it is preferred that the fatty acid or fatty amine is contained in an amount of 0.1 to 50 wt %, preferably 0.1 to 45 wt % based on the total weight of the additive.

Hitherto, it has been difficult to produce an over-based sulfurized alkaline earth metal phenate having a high base number together with a low viscosity, good color and good oil solubility. Accordingly, to make it possible to produce such a phenate, known methods require complex operations such as repetition of a sulfurized metal addition reaction.

According to the present invention, it is possible to provide an over-based sulfurized alkaline earth metal phenate having a high base number with a low viscosity and which is excellent in the color and the solubility in lubricating oils. Furthermore, the present invention provides such an excellent phenate by one sulfurized metal addition reaction with easiness and low costs.

The present invention is now illustrated in greater detail by reference to the following examples which, however, are not to be construed as limiting the invention in any way.

EXAMPLE 1

Into a 1-liter autoclave equipped with a stirrer, a gas-introducing tube and a thermometer, were charged 552.2 g (2.1 mol) of 99.8%-pure dodecylphenol, 41.4 g (0.7 mol) of 94.9%-pure calcium oxide, 6.7 g (0.2 mol) of sulfur (0.3 mol per mol of calcium oxide) and 5.0 g (0.018 mol) of stearic acid (0.025 mol per mol of calcium oxide), and then stirred. To the resulting suspension, was added 65.2 g (1.1 mol) of ethylene glycol at 125° C. The reaction mixture was stirred at 130° C. under a gauge pressure of about 3.0 atm and closed conditions for about 3 hours. While the pressure of the reaction system was gradually reduced, the water formed, a part of the unreacted ethylene glycol and a small amount of dodecylphenol were distilled off to obtain 618.3 g of a liquid distillation residue. The temperature of the final distillate was 140° C. (3 mmHg). After 5.0 g (0.3 mol) of water (0.4 mol per mol of calcium oxide) was added to 618.3 g of the distillation residue, carbon dioxide was then allowed to be absorbed by the resulting distillation residue from the reduced pressure condition at a heating temperature of 150° C. for 30 minutes. The carbon dioxide was supplied to the autoclave at a rate of 0.315 l/min. Thereafter, the reaction system was heated to 178° C. and pressurized to a gauge pressure of 5.0 atm with carbon dioxide, and allowed to stand for 2.0 hours to obtain 648.3 g of a reaction product. 648.3 g of the reaction product was mixed with 117.4 g of 150 neutral oil as a diluent. The resulting reaction product was transferred to a three-necked pear-shaped flask and subjected to distillation under a reduced pressure to remove a small amount of ethylene glycol and most of the unreacted dodecylphenol, thereby obtaining 182.4 g of a distillation residue. The temperature of the final distillate was 225° C. (1.5 mmHg). The resulting distillation residue was diluted with a great amount of hexane, and 12.6 g of an insoluble matter removed by centrifugal separation, and the greatly added hexane removed by distillation, thereby obtaining 163.3 g of a final product.

The properties of the final product are shown in Table 1.

EXAMPLE 2

The procedure of Example 1 was repeated, except that the stearic acid was added in an amount of 0.05 mol per mol of calcium oxide. The yield of a final product was 184.6 g.

The properties of the final product are shown in Table 1.

EXAMPLE 3

The procedure of Example 1 was repeated, except that the stearic acid was added in an amount of 0.1 mol per mol of calcium oxide. The yield of a final product was 196.7 g.

The properties of the final product are shown in Table 1.

EXAMPLE 4

The procedure of Example 3 was repeated, except that the stearic acid was added after the sulfurized metal addition reaction but before the addition of water to the distillation residue which had distilled off therefrom water formed, a part of the unreacted ethylene glycol and a small amount of dodecylphenol. The yield of a final product was 224.8 g.

The properties of the final product are shown in Table 1.

EXAMPLE 5

The procedure of Example 1 was repeated, except that the stearic acid was added in an amount of 0.3 mol per mol of calcium oxide. The yield of a final product was 225.3 g.

The properties of the final product are shown in Table 1.

EXAMPLE 6

The procedure of Example 1 was repeated, except that the stearic acid was added in an amount of 0.6 mol per mol of calcium oxide. The yield of a final product was 268.5 g.

The properties of the final product are shown in Table 1.

EXAMPLE 7

The procedure of Example 3 was repeated, except that the stearic acid was replaced with behenic acid. The yield of a final product was 198.1 g.

The properties of the final product are shown in Table 1.

EXAMPLE 8

The procedure of Example 3 was repeated, except that the stearic acid was replaced with palmitic acid. The yield of a final product was 193.3 g.

The properties of the final product are shown in Table 1.

EXAMPLE 9

The procedure of Example 1 was repeated, except that the stearic acid was added in an amount of 0.1 mol per mol of calcium oxide and the sulfur was used in an amount of 0.2 mol per mol of calcium oxide. The yield of a final product was 185.4 g.

The properties of the final product are shown in Table 1.

EXAMPLE 10

The procedure of Example 1 was repeated, except that the stearic acid was replaced with calcium stearate in an amount of 0.05 mol per mol of calcium oxide and the sulfur was added in an amount of 0.2 mol per mol of calcium oxide. The yield of a final product was 174.4 g.

The properties of the final product are shown in Table 1.

EXAMPLE 11

The procedure of Example 1 was repeated, except that the stearic acid was added in an amount of 0.1 mol per mol of calcium oxide, the 99.8%-pure dodecylphenol was added in an amount of 0.1 mol per mol of calcium oxide, and the 72.9%-pure recovered dodecylphenol was added in an amount of 2.0 mol per mol of calcium oxide. The yield of a final product was 186.4 g.

The properties of the final product are shown in Table 1.

EXAMPLE 12

The procedure of Example 1 was repeated, except that methanol was added in an amount of 1.0 mol per mol of calcium oxide in place of the water added at the carbon dioxide treatment and the stearic acid was added in an amount of 0.1 mol per mol of calcium oxide. The yield of a final product was 212.2 g.

The properties of the final product are shown in Table 1.

COMPARATIVE EXAMPLE 1

The procedure of Example 1 was repeated, except that the stearic acid was not added. The yield of a final product was 259.1 g.

The properties of the final product are shown in Table 1.

COMPARATIVE EXAMPLE 2

The procedure of Example 3 was repeated, except that the water was not added before the carbon dioxide treatment. The yield of a final product was 261.9 g.

The properties of the final product are shown in Table 1.

TABLE 1

| | Fatty Acid (mol/mol)[1] | Base number (mgKOH/g) | Viscosity (cSt, at 100° C.) | Color (ASTM) | Oil solubility[2] | Content of fatty acid in product (wt %) |
|---|---|---|---|---|---|---|
| Ex. 1: | 0.025 | 352 | 432 | L 3.0 Dil[2] | Δ | 2.8 |
| Ex. 2: | 0.05 | 321 | 179 | L 4.0 Dil | ○ | 4.8 |
| Ex. 3: | 0.1 | 300 | 93 | 4.5 Dil | ○ | 9.3 |
| Ex. 4: | 0.1 | 300 | 179 | L 4.0 Dil | ○ | 8.0 |
| Ex. 5: | 0.3 | 275 | 70 | L 4.0 Dil | ○ | 24.1 |
| Ex. 6: | 0.6 | 260 | 80 | L 4.0 Dil | ○ | 39.6 |
| Ex. 7: | 0.1 | 292 | 85 | L 4.0 Dil | ○ | 9.9 |
| Ex. 8: | 0.1 | 305 | 98 | L 4.0 Dil | ○ | 8.4 |
| Ex. 9: | 0.1 | 370 | 331 | 4.0 Dil | ○ | 9.1 |
| Ex. 10: | 0.5(*) | 360 | 920 | 3.0 Dil | ○ | 9.3 |
| Ex. 11: | 0.1 | 398 | 335 | L 5.0 Dil | ○ | 9.1 |
| Ex. 12: | 0.1 | 291 | 182 | L 4.0 Dil | ○ | 9.9 |
| Comp. Ex. 1: | 0 | 320 | 623 | L 4.0 Dil[2] | x | 0 |
| Comp. Ex. 2: | 0.1 | 231 | 152 | L 4.0 Dil | ○ | 7.0 |

Notes:
[1] Mol of Fatty acid/Mol of Alkaline earth metal reagent
[2] Determined after stirring for 5 min. at 60° C. under condition that the product was added to a Middle East paraffinic engine oil to have the base number of 78 mgKOH/g.
(*) Mol of calcium stearate/Mol of Alkaline earth metal reagent
○: Completely dissolved, Δ: Slightly turbid, X: Insoluble

EXAMPLE 13

Into a 1-liter autoclave equipped with a stirrer, a gas-introducing tube and a thermometer, were charged 552.2 g (2.1 mol) of 99.8%-pure dodecylphenol, 41.4 g (0.7 mol) of 94.9%-pure calcium oxide, 4.5 g (0.1 mol) of sulfur (0.2 mol per mol of calcium oxide) and 18.9 g (0.07 mol) of stearylamine (0.1 mol per mol of calcium oxide), and then stirred. To the resulting suspension was added 65.2 g (1.1 mol) of ethylene glycol at 125° C. The reaction mixture was stirred at 130° C. under a gauge pressure of about 3.0 atm and closed conditions for about 3 hours. While the pressure of the reaction system was gradually reduced, the water formed, a part of the unreacted ethylene glycol and a small amount of the dodecylphenol were distilled off to obtain 626.4 g of a liquid distillation residue. The temperature of the final distillate was 144° C. (6 mmHg). After 5.0 g (0.3 mol) of water (0.4 mol per mol of calcium oxide) was added to 626.4 g of the distillation residue, carbon dioxide was then allowed to be absorbed by the resulting distillation residue from the reduced condition at a heating temperature of 150° C. for 30 minutes. The carbon dioxide was supplied to the autoclave at a rate of 0.315 l/min. Thereafter, the reaction system was heated to 178° C. and pressurized to a gauge pressure of 5.0 atm with carbon dioxide, and allowed to stand for 2.0 hours to obtain 662.8 g of a reaction product. 662.8 g of the reaction product was mixed with 97.7 g of 150 neutral oil as a diluent. The resulting reaction product was transferred to a three-neck pear-shaped flask and subjected to distillation under a reduced pressure to remove a small amount of the ethylene glycol and most of the unreacted dodecylphenol, thereby obtaining 183.1 g of a distillation residue. The temperature of the final distillate was 230° C. (2.5 mmHg). The resulting distillation residue was diluted with a great amount of hexane, 3.5 g of an insoluble matter removed by centrifugal separation, and the greatly added hexane removed by distillation, thereby obtaining 175.4 g of a final product.

The weight ratio of the reaction materials are shown in Table 2 and the properties of the final product are shown in Table 3.

EXAMPLES 14 AND 15

The procedure of Example 13 was repeated, except that the stearylamine was added as set forth in Table 2.

The properties of the final products are shown in Table 3.

COMPARATIVE EXAMPLE 3

The procedure of Example 13 was repeated, except that the stearylamine was not added.

The properties of the final product are shown in Table 3.

COMPARATIVE EXAMPLE 4

The procedure of Example 13 was repeated, except that the stearylamine and the water at the carbon dioxide treatment were not added.

The properties of the final product are shown in Table 3.

EXAMPLES 16 TO 20

The procedure of Example 13 was repeated, except that the reaction materials were changed as set forth in Table 4. In Example 20, hexadecylamine was used in place of the stearylamine.

The properties of the final products are shown in Table 5.

EXAMPLE 21

The procedure of Example 13 was repeated, except that methanol was added in an amount of 0.5 mol per mol of calcium oxide in place of the water added at the carbon dioxide treatment. The yield of the final product was 183.3 g.

The properties of the final product are shown in Table 5.

TABLE 2

| | Ex. 13 | Ex. 14 | Ex. 15 | Comp. Ex. 3 | Comp. Ex. 4 |
|---|---|---|---|---|---|
| Stearylamine: | 0.1 | 0.2 | 0.05 | 0 | 0 |
| H$_2$O at CO$_2$ treatment: | 0.4 | 0.4 | 0.4 | 0.4 | 0 |
| Sulfur: | 0.2 | 0.2 | 0.2 | 0.2 | 0.2 |
| Dodecyphenol: | 3.0 | 3.0 | 3.0 | 3.0 | 3.0 |

TABLE 2-continued

|  | Ex. 13 | Ex. 14 | Ex. 15 | Comp. Ex. 3 | Comp. Ex. 4 |
|---|---|---|---|---|---|
| Ethylene glycol: | 1.5 | 1.5 | 1.5 | 1.5 | 1.5 |

Note: The numerals are expressed as the molar number per mol of CaO which was used in an amount of 0.7 mol.

TABLE 3

|  | Ex. 13 | Ex. 14 | Ex. 15 | Comp. Ex. 3 | Comp. Ex. 4 |
|---|---|---|---|---|---|
| Base number: | 383 | 363 | 390 | 352 | 252 |
| Viscosity: | 621 | 552 | 715 | 821 | 260 |
| Color (ASTM): | L 3.0 Dil | L 3.0 Dil | L 6.0 Dil | L 4.0 Dil2 | L 4.0 Dil |
| Oil solubility: | o | o | Δ | X | o |

Notes:
Oil solubility: Determined after stirring for 5 min. at 60° C. under condition that the product was added to a Middle East paraffinic engine oil to have the base number of 78 mgKOH/g.
o: Completely dissolved, Δ: Slightly turbid, X: Insoluble

TABLE 4

|  | Ex. 16 | Ex. 17 | Ex. 18 | Ex. 19 | Ex. 20 |
|---|---|---|---|---|---|
| Stearlyamine: | 0.1 | 0.1 | 0.1 | 0.1 | 0.1* |
| $H_2O$ at $CO_2$ treatment: | 0.3 | 0.5 | 0.5 | 0.5 | 0.5 |
| Sulfur: | 0.2 | 0.2 | 0.3 | 0.7 | 0.7 |
| Dodecyphenol: | 3.0 | 3.0 | 3.0 | 3.0 | 3.0 |
| Ethylene glycol: | 1.5 | 1.5 | 1.5 | 1.5 | 1.5 |

Notes: The numerals are expressed as the molar number per mol of CaO which was used in an amount of 0.7 mol.
In Example 20, hexadecylamine was used in place of stearylamine.

TABLE 5

|  | Ex. 16 | Ex. 17 | Ex. 18 | Ex. 19 | Ex. 20 | Ex. 21 |
|---|---|---|---|---|---|---|
| Base number: | 372 | 368 | 355 | 322 | 389 | 372 |
| Viscosity: | 651 | 518 | 651 | 685 | 659 | 621 |
| Color (ASTM): | L 3.0 DiL | L 3.5 Dil | L 4.0 DiL | L 4.5 Dil | L 3.0 Dil | L 4.0 Dil |
| Oil solubility: | o | o | o | o | o | o |

Notes: Oil solubility: Determined after stirring for 5 min. at 60° C. under condition that the product was added to a Middle East paraffinic engine oil to have the base number of 78 mgKOH/g.
o: Completely dissolved While the invention has been described in detail and with reference to specific embodiments thereof, it will be apparent to one skill in the art that various changes and modifications can be made therein without departing from the spirit and scope thereof.

What is claimed is:

1. A process for producing an over-based sulfurized alkaline earth metal phenate which comprises reacting either a mixture of reaction materials comprising a phenol, a dihydric alcohol, an alkaline earth metal reagent which is an alkaline earth metal oxide or hydroxide or a mixture of both, and sulfur or a mixture of these reaction materials with water, distilling off an excess amount of the dihydric alcohol and at least excess amount of water, and subsequently treating the resulting distillation residue with carbon dioxide, wherein the carbon dioxide treatment is carried out (A) in the presence of 0.001 to 0.7 mol of a fatty acid or a fatty amine per 1 mol of the alkaline earth metal reagent and (B) in the presence of either (i) 0.01 to 0.9 mol of water per 1 mol of the alkaline earth metal reagent or (ii) 0.05 to 5.0 mol of a lower alcohol containing 1 to 4 carbon atoms per 1 mol of the alkaline earth metal reagent or (iii) both of (i) the water and (ii) the lower alcohol.

2. The process as claimed in claim 1, wherein the phenol is a phenol having a hydrocarbon side chain of 4 to 36 carbon atoms.

3. The process as claimed in claim 1, wherein the alkaline earth metal reagent is an oxide or hydroxide of calcium, barium, strontium or magnesium.

4. The process as claimed in claim 1, wherein the alkaline earth metal reagent is used in amount of 0.01 to 0.99 equivalent per one equivalent of the phenol.

5. The process as claimed in claim 1, wherein the dihydric alcohol is ethylene glycol or propylene glycol.

6. The process as claimed in claim 1, wherein the dihydric alcohol is used in an amount of 0.15 to 3.0 mol per mol of the alkaline earth metal reagent.

7. The process as claimed in claim 1, wherein the sulfur is used in an amount of 0.001 to 3.0 mol per mol of the alkaline earth metal reagent.

8. The process as claimed in claim 1, wherein the water is added in an amount of about 0.01 to 10 mol per mol of the alkaline earth metal reagent at the metal addition reaction stage.

9. The process as claimed in claim 1, wherein the fatty acid is used in an amount of 0.05 to 0.6 mol per mol of the alkaline earth metal reagent and the fatty amine is used in an amount of 0.05 to 0.4 mol per mol of the alkaline earth metal reagent.

10. The process as claimed in claim 1, wherein the fatty acid is selected from the group consisting of capric acid, lauric acid, palmitic acid, stearic acid, behenic acid, lignoceric acid, cerotic acid, montanic acid, and melissic acid and the fatty acid amine is selected from the group consisting of decylamine, undecylamine, dodecylamine, tridecylamine, tetradecylamine, pentadecylamine, hexadecylamine, heptadecylamine, and stearylamine.

11. The process as claimed in claim 1, wherein the carbon dioxide treatment is carried out in the presence of 0.1 to 0.5 mol of water per mol of the alkaline earth metal reagent and 0.1 to 1.5 mol of a lower alcohol containing 1 to 4 carbon atoms per mol of the alkaline earth metal reagent.

12. The process as claimed in claim 1, wherein the lower alcohol containing 1 to 4 carbon atoms is selected from the group consisting of methyl alcohol, ethyl alcohol, n-propyl alcohol, i-propyl alcohol, and n-butyl alcohol.

13. The process as claimed in claim 1, wherein the metal addition reaction or the carbon dioxide treatment is carried out in the presence of a diluent.

14. The process as claimed in claim 1, wherein the carbon dioxide treatment is carried out at a reaction temperature of 50° to 230° C. under a pressure of 0.01 to 51 atm.A.

15. An over-based sulfurized alkaline earth metal phenate having a base number of 250 to 400 mgKOH/g, a viscosity of 40 to 1,000 cSt at 100° C. and a color of L3.0 to 8.0Dil (by ASTM), and contains 0.1 to 50 wt % of the fatty acid or the fatty amine based on the total amount thereof, which is produced by a process which comprises reacting either a mixture of reaction materials comprising a phenol, a dihydric alcohol, an alkaline earth metal reagent which is an alkaline earth metal oxide or hydroxide or a mixture of both, and sulfur or a mixture of these reaction materials with water, distilling off an excess amount of the dihydric alcohol and at least excess amount of water, and subsequently treating the resulting distillation residue with carbon dioxide, wherein the carbon dioxide treatment is carried out (A) in the presence of 0.001 to 0.7 mol of a fatty acid or a fatty amine per 1 mol of the alkaline earth metal reagent and (B) in the presence of either (i) 0.01 to 0.9 mol of water per 1 mol of the alkaline earth metal reagent or (ii) 0.05 to 5.0 mol of a lower alcohol containing 1 to 4 carbon atoms per 1 mol of the alkaline earth metal reagent or (iii) both of (i) the water and (ii) the alcohol.

* * * * *